US005184542A

United States Patent [19]

Bottino et al.

[11] Patent Number: 5,184,542

[45] Date of Patent: Feb. 9, 1993

[54] DRIER FOR PASTA

[75] Inventors: Pier C. Bottino; Fausto Bertozzi; Renzo Oddi; Eros Rolli, all of Parma, Italy

[73] Assignee: Barilla G. e R. F.lli-Societa per Azioni, Parma, Italy

[21] Appl. No.: 872,328

[22] Filed: Apr. 23, 1992

[30] Foreign Application Priority Data

Apr. 23, 1991 [IT] Italy ........................ 001114 A/91

[51] Int. Cl.[5] ..................... A23L 1/16; F26B 11/18; F26B 13/02; F26B 13/10

[52] U.S. Cl. ................................. 99/483; 34/207; 34/216; 99/361; 99/427; 99/443 C; 99/479; 198/465.3; 198/952

[58] Field of Search ................ 99/352, 355, 360-363, 99/367, 427, 443 R, 443 C, 477-479; 34/105, 126, 203, 204, 207, 216, 217; 198/952, 427, 457, 575, 681, 803.2, 687.1, 465.3

[56] References Cited

U.S. PATENT DOCUMENTS

| | | | |
|---|---|---|---|
| 1,391,939 | 9/1921 | Collins | 34/126 |
| 1,498,774 | 2/1922 | Baldwin . | |
| 1,539,976 | 9/1923 | Vernaci . | |
| 1,839,628 | 1/1932 | Williams | 34/207 |
| 1,891,873 | 12/1932 | Elbe | 99/478 |
| 2,583,847 | 4/1949 | Hummel . | |
| 2,622,344 | 12/1952 | Newman | 34/207 |
| 2,632,378 | 3/1953 | Carvallo | 99/361 |
| 2,988,819 | 6/1961 | Samson | 34/216 |
| 3,165,055 | 1/1965 | Van Der Winden | 99/362 |
| 3,202,115 | 8/1965 | Jones, Jr. | 34/204 |
| 3,258,103 | 1/1964 | Bontempi . | |
| 3,268,055 | 8/1964 | Stein . | |
| 3,295,434 | 1/1967 | Wilhelm et al. | 99/427 |
| 3,323,227 | 3/1963 | Bassano . | |
| 4,323,585 | 4/1982 | Manser | 34/195 |
| 4,538,363 | 9/1985 | Zagoroff . | |
| 4,699,048 | 10/1987 | Pavan . | |
| 5,062,221 | 11/1991 | Fazion | 34/204 |

FOREIGN PATENT DOCUMENTS

| | | | |
|---|---|---|---|
| 293416 | 5/1914 | Fed. Rep. of Germany . | |
| 2702247 | 7/1978 | Fed. Rep. of Germany . | |
| 1027391 | 5/1953 | France . | |
| 587689 | 4/1958 | Italy | 34/204 |

*Primary Examiner*—Timothy F. Simone

*Attorney, Agent, or Firm*—Sughrue, Mion, Zinn, Macpeak & Seas

[57] ABSTRACT

A drier comprises a plurality of structurally independent drying chambers in each of which a respective climate, which does not interfere with that of the other chambers, is created and controlled. The chambers, each of which is equipped with its own conveyor for pasta-holders, are connected by tunnels in which devices transfer the holders from one chamber to another.

12 Claims, 8 Drawing Sheets

DRIER FOR PASTA

BACKGROUND OF THE INVENTION

The present invention relates to a drier for pasta.

As is known, and in the following description and the subsequent claims, dry pasta generally means pasta with a water content of between 11.5 and 12.5% by weight.

In order to produce dry pasta, one generally starts with a dough of durum wheat flour or semolina and water or eggs which, for reasons of good handling and machinability, must have a water content of 30-32% by weight and this value is then brought to the desired value of 11.5-12.5% by a suitable drying process.

It is recognised that the organoleptic and nutritive characteristics of the dry pasta produced, as well as its ability to withstand cooking which, as is well known, affect the commercial value of the finished product, are affected by the way in which such a process is carried out.

The ability to withstand cooking is correlated to a known parameter called the cooking factor. This parameter takes account of the chewability, palatability, consistency and organoleptic characteristics of the pasta after cooking. In this connection, the pasta must have good chewing strength (it should not be hard or stick to the teeth) but should have the consistency typical of so-called "al dente" pasta, it should be slippery and flexible in the dish, and it should not develop a patina which makes its surface sticky or glutinous.

Another important factor associated with the drying method is constituted by the danger of the nutritive properties (in particular the essential aminoacids) of the pasta being degraded by heat, the extent of this degradation being considered by many to depend on the drying temperature and period.

For these reasons, methods of drying fresh pasta are amongst the methods and processes which have been investigated most and have received greatest technical attention in the food-science field.

This is shown, amongst other things, by the host of patents published on an international scale on the subject of methods of drying fresh pasta.

For example, amongst the drying methods established for some time in the art, the best known is carried out entirely at a low temperature within the range of between 40° and 60° C. The organoleptic and nutritive qualities of the dry pasta thus produced remain almost unaltered but, according to some critics, it has high acidity and a poor cooking factor which adversely affect its commercial qualities.

Another equally widespread method, which was established in order to overcome the long periods of time (of the order of 16-24 hours) required to carry out the method mentioned above and to reduce the considerable lengths of the driers needed as a result, provides for treatment at very high temperatures of up to 110-120° C. Whilst this method of treatment can drastically reduce the dimensions of the driers, the nutritional and organoleptic properties of the durum wheat semolina used cannot always be kept intact since they may be altered substantially by the high temperatures which, in particular, cause thermal degradation of the essential aminoacids in the dry pasta produced.

According to another method established by the present applicant, the drying is carried out in a plurality of successive isothermal heat-treatment stages, with a gradual increase of the temperature within the range of from 40° to 110° C.

All these methods and all the variants and different characteristics of the methods implemented by the numerous producers have required the design, production and setting-up of corresponding driers or at least the substantial modification of existing driers.

This situation, which is not at all rational from a commercial and technical point of view, is likely to be further complicated in view of continuing investigations into the nature and intrinsic characteristics of pasta, and into the variability of these characteristics in dependence on the type of ingredients used, and of the constantly increasing knowledge and/or interpretations of the chemical/physical phenomena which take place during the drying of pasta.

SUMMARY OF THE INVENTION

The present invention is based on the problem of devising and providing a drier for pasta which has structural and functional characteristics such that it can completely satisfy the requirements of any drying method and any variant thereof by means of a few quick and easy alterations of those characteristics.

According to the invention, this problem is solved by a drier for pasta comprising a plurality of structurally independent drying chambers, each of which has its own conventional means for independently creating, regulating and controlling respective predetermined ambient climatic conditions, each chamber having a pasta-inlet port and a pasta-outlet port, characterised in that it includes:

means for hermetically closing and opening the ports, an endless pasta conveyor extending in each drying chamber, in a position such that it is accessible through the pasta-inlet and outlet ports, a plurality of removable pasta-holders on the conveyor, a plurality of tunnels connecting the drying chambers, each tunnel connecting two successive, adjacent chambers and extending from the pasta-outlet port of one chamber to the pasta-inlet port of the other chamber, and a transfer device installed in each tunnel for removing the pasta-holder from the conveyor of one drying chamber and placing it on the conveyor of the next, adjacent chamber.

BRIEF DESCRIPTION OF THE DRAWINGS

The advantages and characteristics of a pasta drier according to the invention will become clearer from the following description of an embodiment thereof, given by way of non-limiting example with reference to the appended drawings, in which.

DETAILED DESCRIPTION OF THE INVENTION

With reference to the drawings, a pasta drier according to the invention includes a plurality of structurally independent drying chambers (four in the embodiment shown) 1, 2, 3 and 4 aligned and spaced apart on a base 5.

To advantage, in a preferred but not exclusive embodiment, the drying chambers are all the same and are all similarly equipped, that is to say, they are modular chambers and, in the following description, reference will therefore be made to only one chamber unless otherwise stated.

Each drying chamber (1 to 4) contains conventional means, not shown, for regulating, controlling and monitoring all the parameters which affect the pasta-drying process, particularly the temperature, the relative humidity, the pressure, etc., as well as devices, shown schematically, for admitting steam, air and anything else required to achieve and maintain climatic-ambient conditions determined beforehand in dependence on a preferred pasta-drying curve.

It should be pointed out and emphasised that the conditions produced in the various drying chambers (1 to 4) are independent of each other, do not affect each other and can be regulated and controlled individually.

Figure 1:
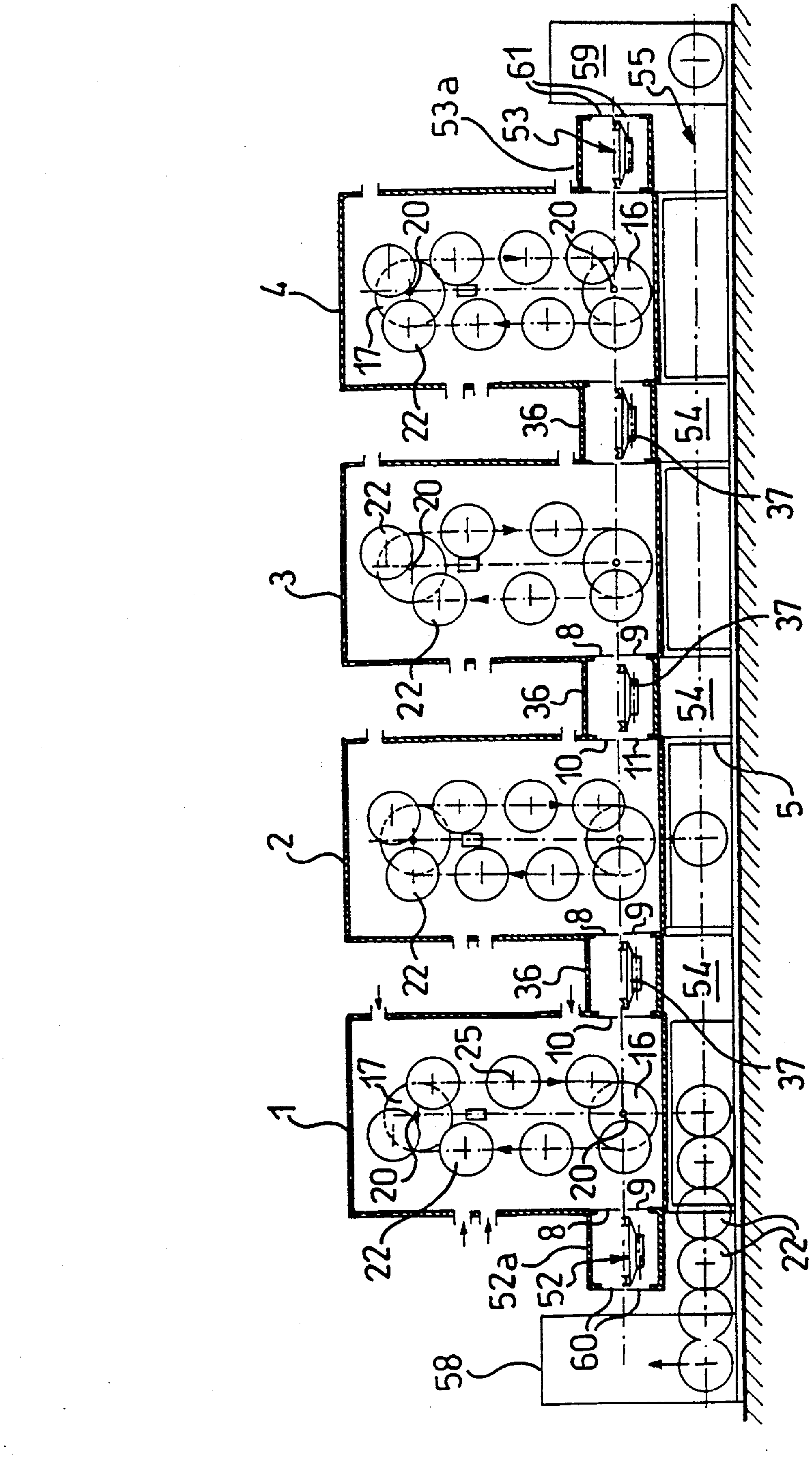
FIG. 1 shows schematically a pasta drier according to the invention.
Figure 2:
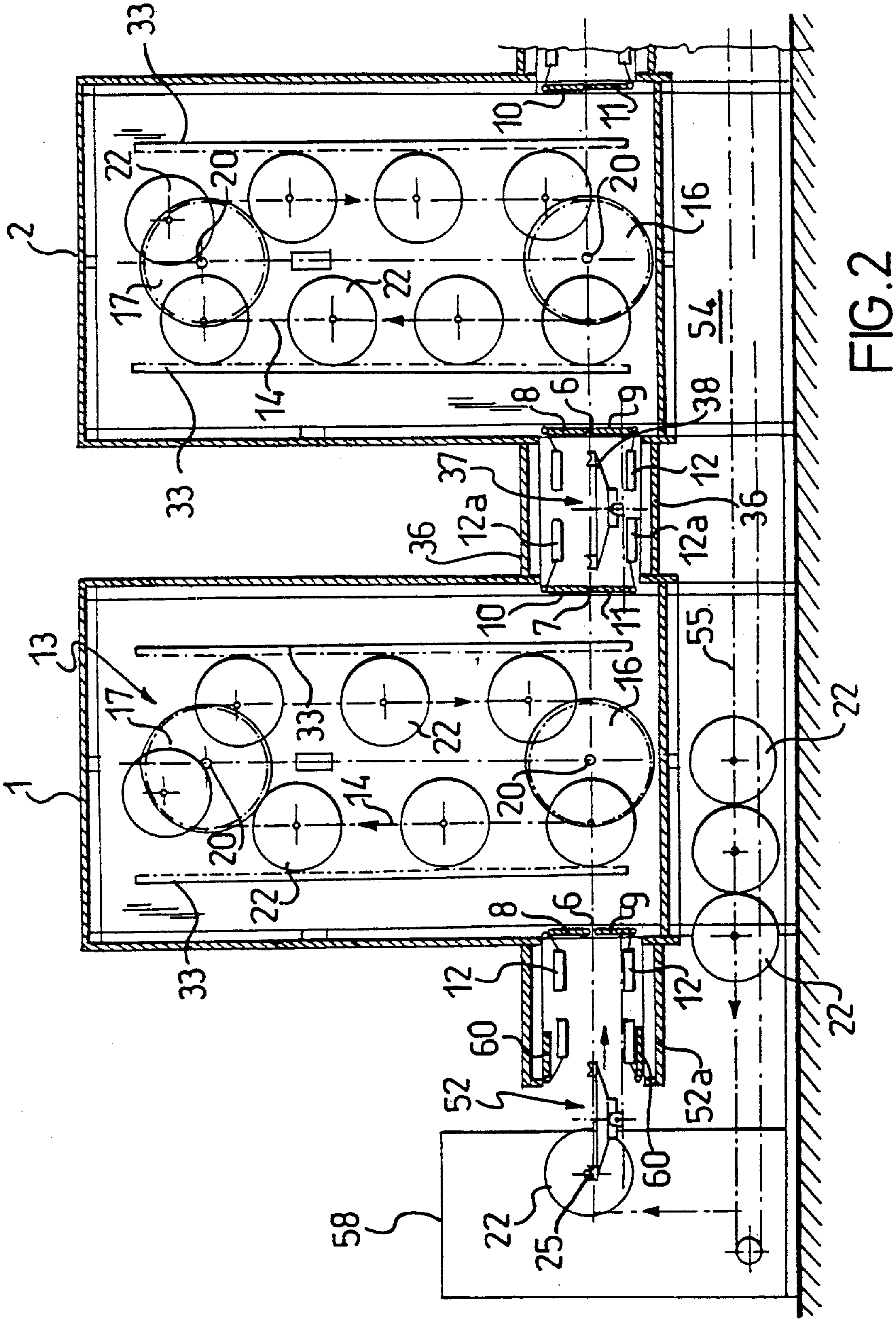
FIG. 2 shows schematically the input side of the drier of FIG. 1, on an enlarged scale.
Figure 3:
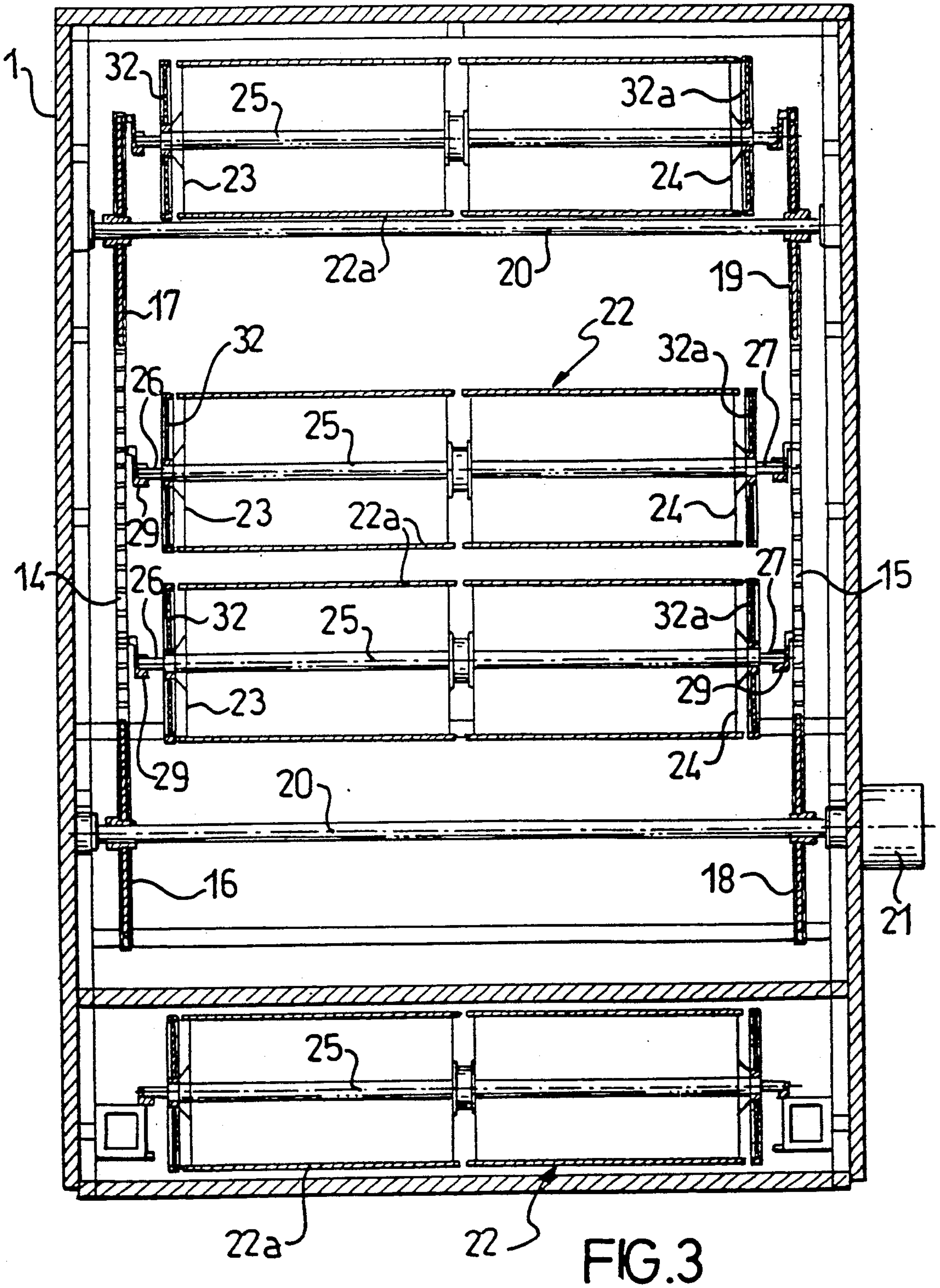
FIG. 3 is a cross-section of a drying chamber.

With reference to FIG. 2, at the bottom of each chamber (1 to 4) is a pasta-inlet port 6 and a pasta-outlet port 7 which can be closed hermetically by respective pairs of gates 8, 9 and 10, 11 operated, for example, by respective pneumatic cylinders 12 and 12*a*.

An endless vertical conveyor 13 in each chamber is accessible through the ports 6, 7. The vertical conveyor 13 is preferably constituted by two parallel, spaced-apart chains 14, 15 supported and driven by respective sprockets 16, 17 and 18, 19. The sprockets 16 and 18 are keyed to the same shaft 20 which extends in correspondence with the pasta-inlet and outlet ports 6 and 7 and is driven by a motor 21 supported outside the drying chamber in question.

Containers or holders 22 for the pasta to be treated in the drying chambers are connected removably to corresponding links of the opposed chains 14, 15.

Figure 4:
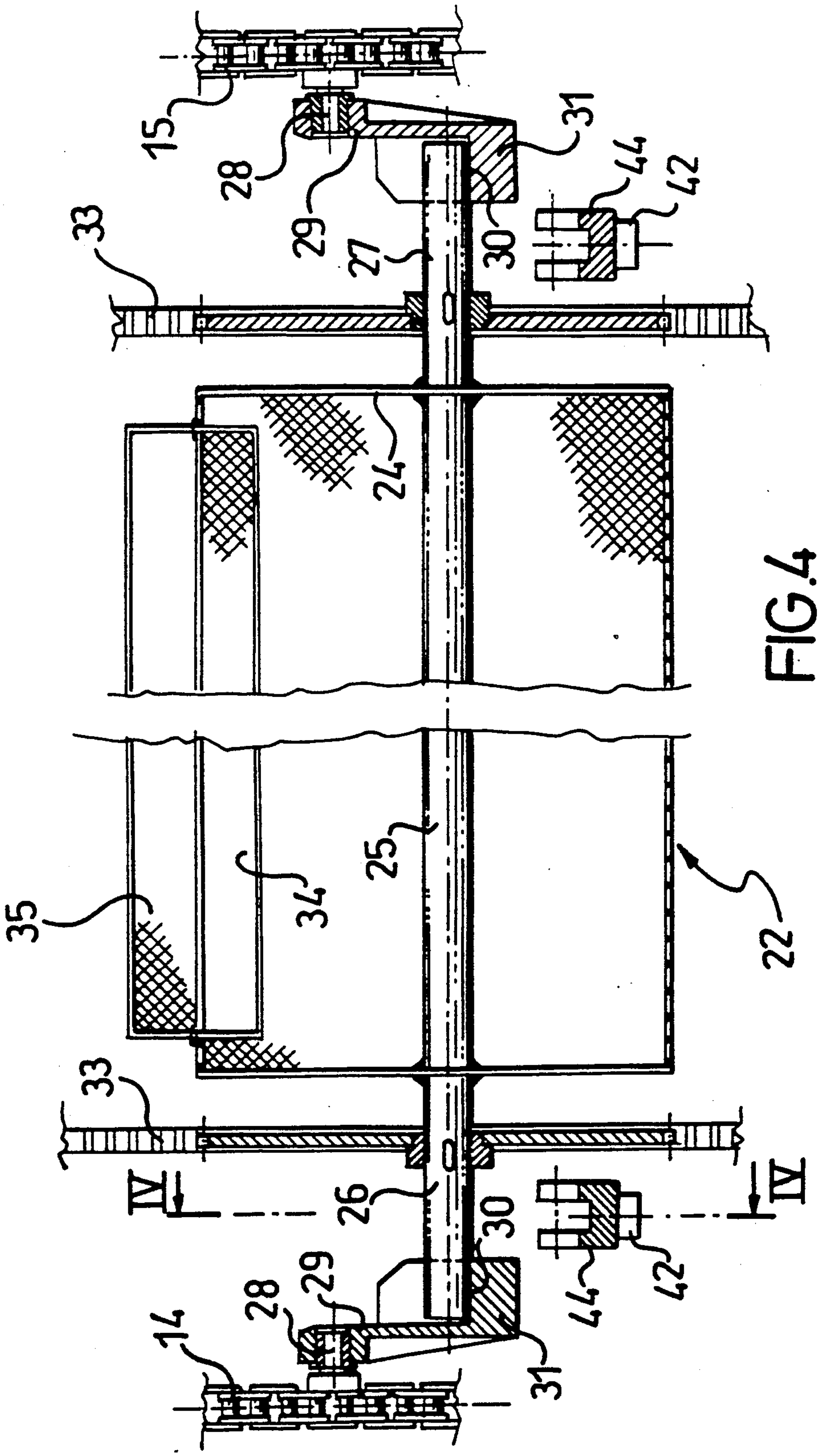
FIG. 4 shows in section the pasta-holder and a detail of the conveyor used in the drying chambers of the drier of the invention, on an enlarged scale.
Figure 6:
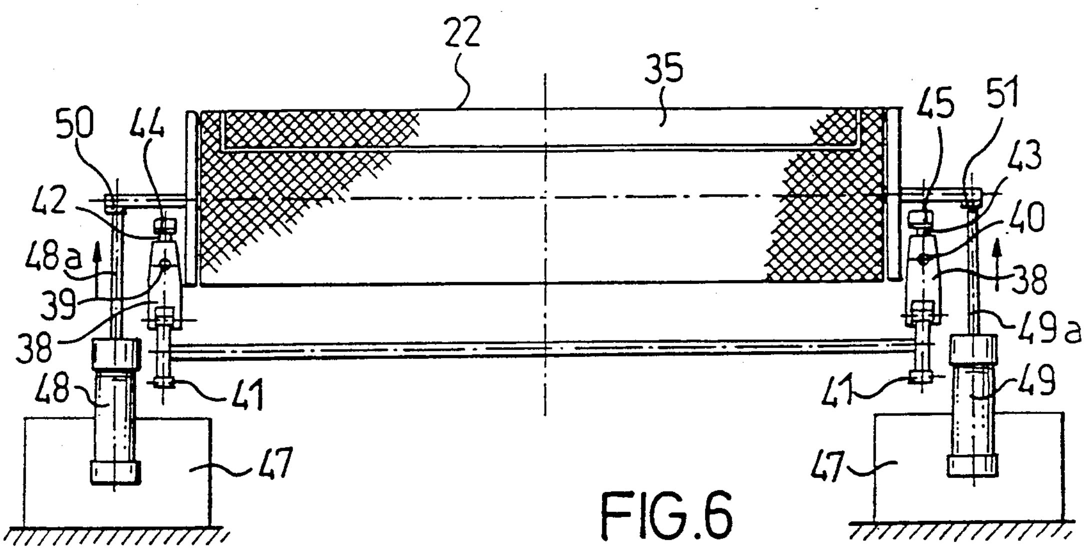
FIG. 6 shows a detail of the drier of FIG. 1, on an enlarged scale.
Figure 5:
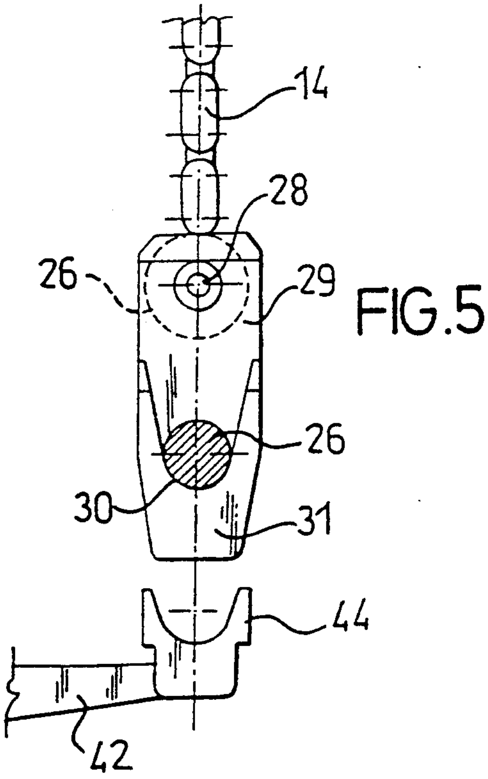
FIG. 5 shows a side view of FIG. 4.
Figure 7:
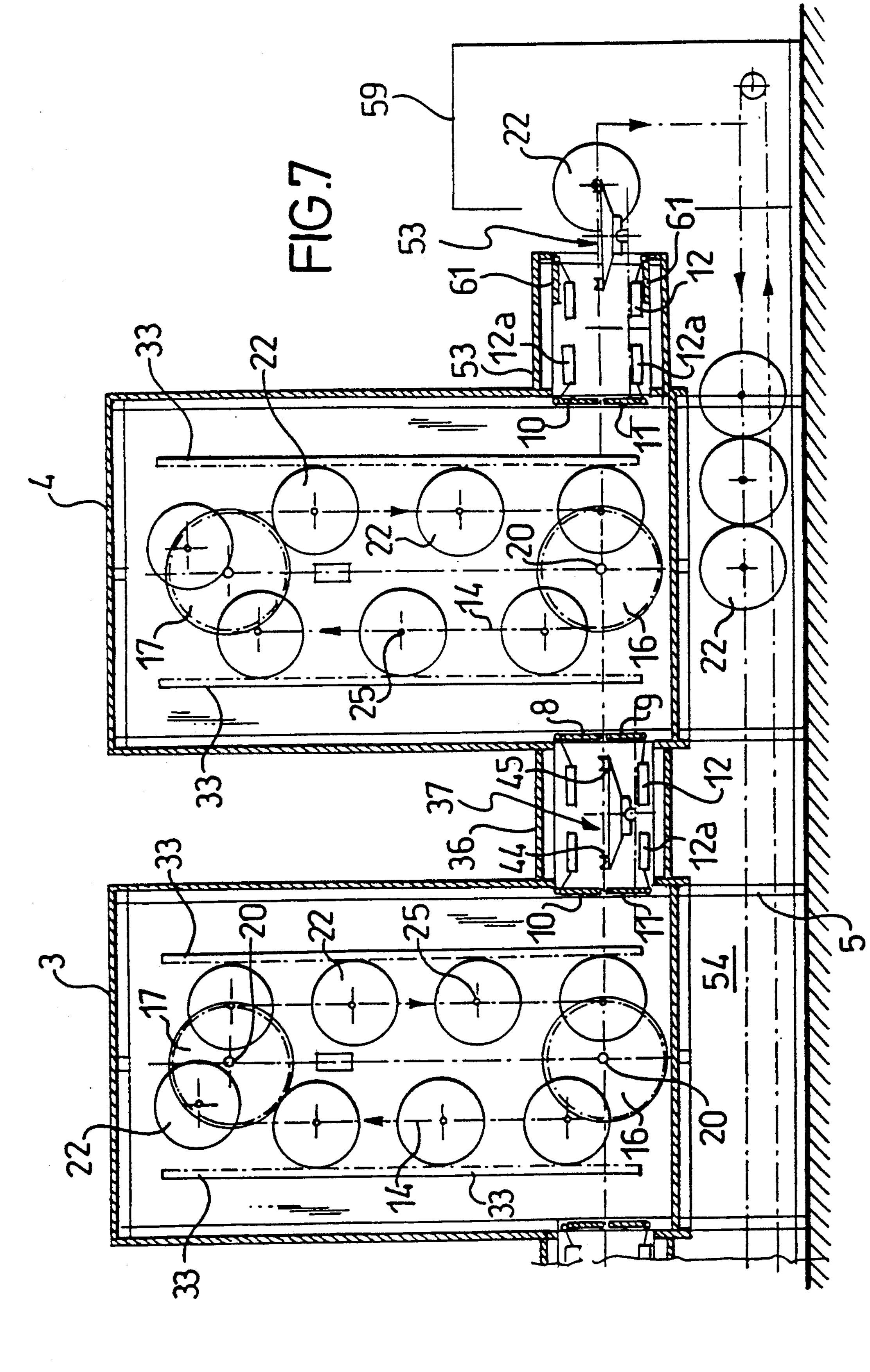
FIG. 7 shows the output side of the drier of FIG. 1, on an enlarged scale.
Figure 8:
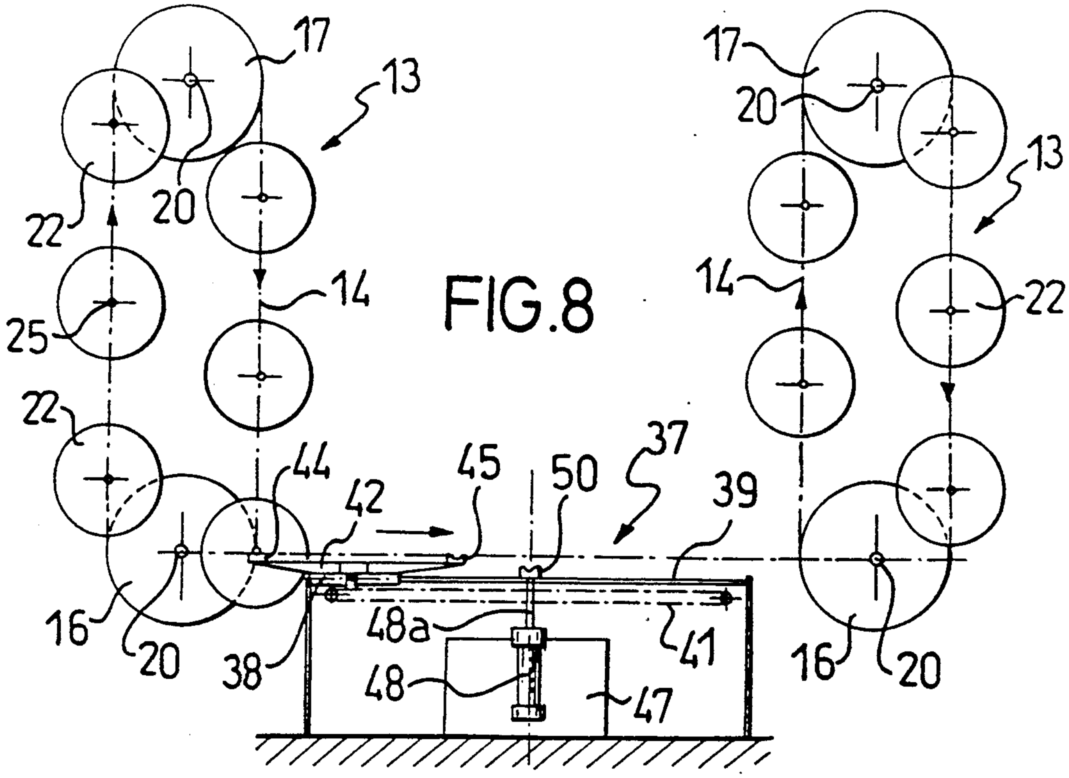
FIGS. 8, 9, 10 and 11 show schematically successive operating stages of the detail shown in FIG. 6.
Figure 9:
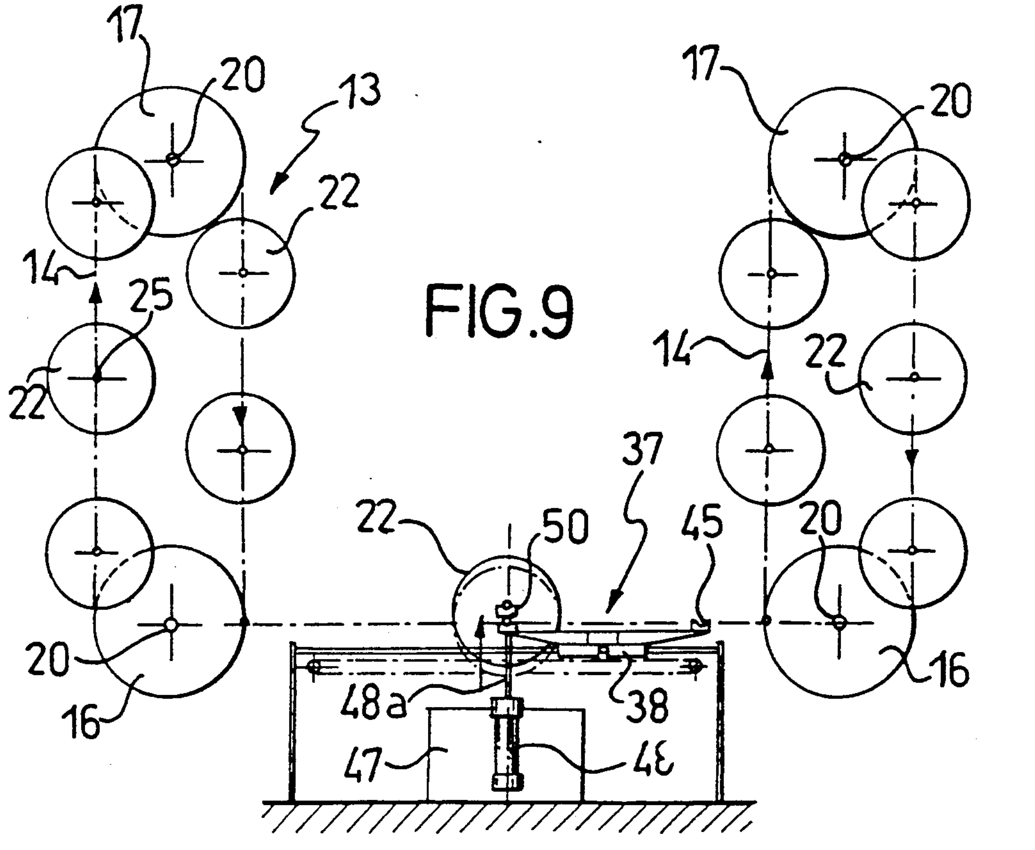

In particular and purely by way of example, the containers 22 are constituted essentially by baskets, preferably cylindrical baskets, for holding predetermined modest quantities of pasta to be dried. They are permeable to air and steam (FIG. 4) and, for this purpose, each preferably has a cylindrical wall 22*a* of netting fixed at opposite ends to the peripheries of discs 23,24 keyed to a shaft 25 coaxial with its cylindrical wall. Outwardly of the discs 23 and 24, the shaft 25 defines two opposed hubs 26, 27 by means of which the container 22 is connected to the opposed chains 14, 15 of the vertical conveyor 13.

For this purpose, a pin 28 projects from each of corresponding links of the opposed chains 14, 15 and the upper end of a rod-like support 29 (a hanger), whose other end 31 is substantially cradle-shaped with a semicylindrical base 30, is rotatable thereon. The cylindrical hubs 26, 27 are supported in the cradles 31 of the supports 29 of the opposed chains 14, 15.

Respective sprockets 32 and 32*a* are keyed to the hubs 26 and 27 of each container 22 for engaging respective rod-like racks 33 supported vertically near the chains 14, 15.

As a result of this engagement, each container 22 rotates about its own axis whilst it is transported within the drying chamber by the chains 14, 15.

It should be noted that the cylindrical wall of the container 22 has a hole 34 with a door 35, also preferably of netting, for loading the pasta into the container and unloading it therefrom.

The drying chambers (1 to 3) are connected to each other by respective tunnels 36 (or air-tight chambers). In the illustrated embodiment of a drier with four drying chambers, there are three tunnels 36 which, to advantage, are all the same and are all similarly equipped, that is to say, they are modular elements.

Each tunnel 36 is fixed releasably to two adjacent drying chambers (1-2; 2-3; 3-4) in correspondence with their respective outlet and inlet ports 7 and 6 in a pressurised-fluid-tight manner by known means, not shown, and is separated therefrom by the gates 10, 11 and 8, 9 which can thus also be considered as tunnel-inlet and tunnel-outlet gates respectively.

To advantage, the pneumatic cylinders 12, 12*a* for operating the gates are installed in the tunnels 36.

Naturally, the tunnels may have their own gates operated independently of those of the chambers.

A device, generally indicated 37, is disposed in each tunnel 36 for transferring a container 22 from one drying chamber to the next, as will become clear from the following description.

In the embodiment in which the containers or holders 22 are constituted by cylindrical baskets hanging from opposed chains 14, 15 of the conveyors 13 in each drying chamber (1 to 4), the device 37 preferably comprises a trolley 38 slidable on horizontal guides 39, 40 extending from the tunnel-inlet gates 8, 9 to the tunnel-outlet gates 10, 11. The trolley is driven by conventional drive means represented schematically by a pair of chains 41, 41 and, on its upper part has two horizontal arms 42, 43 spaced apart by a distance at least equal to the length of a cylindrical basket 22.

Cradle-shaped supports, indicated 44 and 45, are fixed to the opposite ends of the arms 42 and 43 for receiving the hubs 26 and 27 of a cylindrical basket 22.

The arms 42, 43 are of a length such that, when the trolley 38 reaches the end of its travel near the outlet door of a drying chamber (for example, the chamber 1), their ends with their cradle-shaped supports 44 are beside (FIG. 4) the descending passes of the chains 14, 15 of the conveyor 13 and interfere with the downward path of the supports 29 thereof whilst, when the trolley is at the end of its travel near the inlet door of the next drying chamber (for example, the chamber 2), their ends and their cradle-shaped supports 45 are beside the ascending passes of the chains 14, 15 of the conveyor 13 of that chamber, interfering with the upward paths of the supports 29.

A conventional weighing station 47 also installed in each tunnel 36 comprises a pair of hydraulic cylinders 48, 49 with vertical axes spaced from the arms 42, 43 of the trolley 38. Respective cradle-shaped supports 50, 51 are fixed to the rods 48*a*, 49*a* of the hydraulic cylinders for engaging the hubs 26, 27 of a cylindrical basket 22.

Respective transfer devices 52, 53 just like the device 37 described above are positioned and operative at the inlet side and the outlet side of the first and last drying chambers (1, 4) of the drier of the invention to supply the pasta to be dried thereto and discharge the dried pasta therefrom, as will become clear from the following description.

To advantage, the transfer devices 52 and 53 operate in respective tunnels 52*a*, 53*a* which are closed to the exterior by pairs of pneumatically-operated gates 60, 61.

According to a further characteristic of the invention, a tunnel 54 extends longitudinally through the base beneath the plurality of drying chambers 1 to 4. A conveyor, generally indicated 55, disposed in the tunnel 54 is preferably of the type constituted by a pair of parallel chains just like the chains used for the conveyors 13 in the individual drying chambers 1 to 4. As will become clear from the following description, the conveyor 55 extends from a pasta-loading station 58 upstream of the transfer device 52 to a dried-pasta discharge station 59 downstream of the transfer device 53. The conveyor 55 is used for returning the containers or holders 22 (in particular, for example, the cylindrical baskets 22) from the dried-pasta discharge station to the station for the loading of fresh pasta to be dried.

The drier of the invention operates as follows.

For a given drying temperature curve to be implemented and in dependence on the number of operating stages into which it is preferred to divide the curve in order to follow it in the most appropriate manner possible, a drier according to the invention is formed by assembling that number of drying chambers, in each of which ambient conditions exactly corresponding to one of the operating stages is created.

When a predetermined modest quantity of fresh pasta has been loaded into each of a plurality of containers 22, the containers are taken from the station 58 one after another by the transfer device 52 on the input side of the drier and transferred to the ascending pass of the conveyor 13 of the drying chamber 1 (or first chamber). During this operation, by virtue of the alternate operation of the gates 60 of the tunnel 52*a* and the inlet gates 8,9 to the chamber 1, the ambient conditions created in that chamber remain substantially unaltered since it is closed hermetically.

The containers of fresh pasta remain in the first drying chamber for a predetermined "staying period" during which they are circulated through the chamber continuously and, in the case of the cylindrical baskets described above, are rotated about their own axes. The pasta is thus treated as uniformly as possible. Only when the predetermined time for which a container remains in the first drying chamber has fully elapsed is the container removed by the transfer device 37 in the first tunnel 36 and carried to the ascending pass of the conveyor 13 in the second drying chamber (the chamber 2).

For this transfer, after the inlet gates 10 and 11 to the tunnel 36 have been opened whilst the outlet gates 8, 9 of the tunnel are kept closed, the trolley 38 is brought to the end of its travel near the outlet port 7 of the drying chamber 1. In this position, the cradle-shaped supports 44 of the arms 42 are engaged by the hubs 26, 27 of the container 22 in question. As soon as the container is disengaged from the cradles 31 of the hangers 29, the trolley 38 is moved along the tunnel 36 to a position such that the hubs 26 and 27 of the container 20 transported thereby are aligned vertically with the cradle-shaped supports 50, 51 of the hydraulic cylinders 48 and 49 of the weighing station 47.

Figure 10:
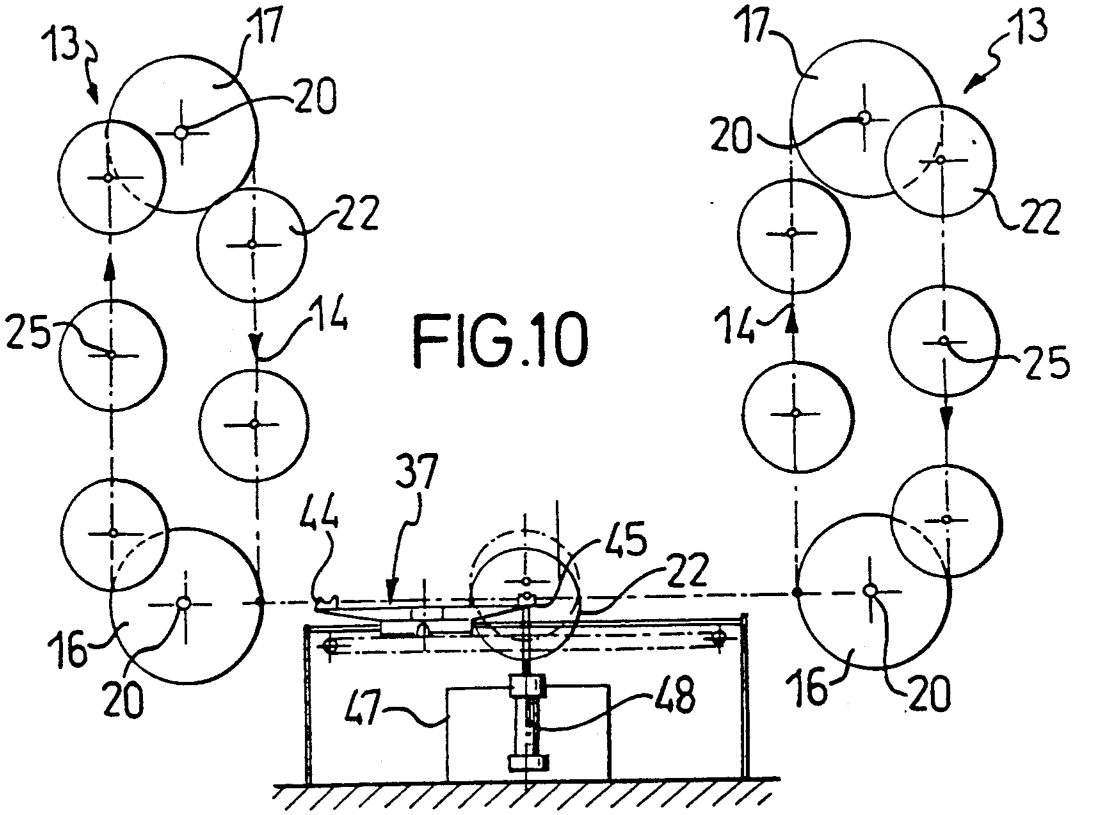
Figure 11:
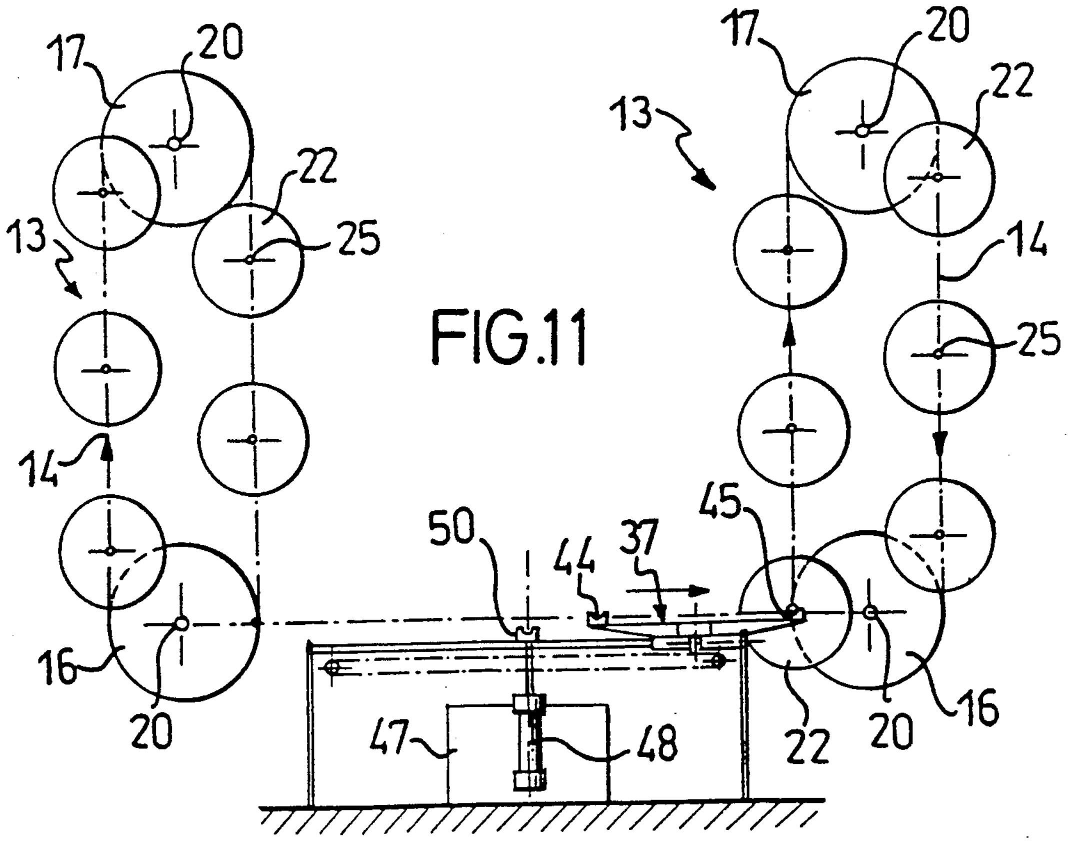

Whilst the gates 10, 11 are closed, the container 22 is lifted and simultaneously weighed by the operation of the hydraulic cylinders 48 and 49. During the weighing, the trolley 38 returns to the drying chamber 1 and stops in a position such that its cradle-shaped supports 45 (FIG. 10) are aligned vertically with the hubs 26, 27 of the container 22. Upon completion of the weighing, the cylinders 48, 49 are lowered again until the container 22 is taken over by the cradle-shaped supports 45 of the trolley 38. After the gates 8, 9 have been opened, the trolley 38 is moved to the end of its travel near the inlet door 6 to the drying chamber 2 (FIG. 11). In this position, the container 22 is placed in the path of the ascending passes of the chains 14, 15 of the conveyor 13 of this chamber and is picked up thereby.

The trolley 38 re-enters into the tunnel 36 where, after the gates 8, 9 are closed, it returns to its starting position ready for the next transfer operation.

If it is clear from the weighing operation that the envisaged stage of the predetermined curve has been completed in the drying chamber 1, the container 22 immediately following that considered above is removed and transferred to the next drying chamber in the same manner.

At the output of the last drying chamber, the dried pasta is discharged from the containers at the station 59 and the containers are quickly sent back to the loading station 58 by the chain conveyor 55 through the tunnel 54 in the base 5 of the drier.

As well as the main advantage that any drying curve can be implemented simply by a few variations of the structure and functional characteristics of the drier of the invention, the drier also affords many other advantages. Thus, for example, a distinct improvement has been achieved in the quality of the finished product due to a large extent to the fact that the drying curve for the product can be divided up and the thermal stress controlled, thus substantially attentuating the reduction in the nutritional quality of the treated pasta.

Moreover, an advantageous reduction in the time and wastage involved in changing the form of pasta and starting/stopping the line is achieved by virtue of the use of the pasta-holders constituted by containers which can be removed from the conveyor.

A further advantage is constituted by rapid adaptability to the optimum conditions for each form of pasta.

The invention thus conceived may be varied or modified in many ways, all of which fall within the scope of its inventive concept. Thus, for example, the containers or holders for the pasta to be dried may differ from the cylindrical baskets described by way of example.

In dependence on the form of pasta to be dried, the supports may be conventional rods for supporting spaghetti, conveyor belts or the like.

What is claimed is:

1. A drier for pasta, comprising a plurality of structurally independent drying chambers, each of which has its own conventional means for independently creating, regulating and controlling respective predetermined ambient climatic conditions, each chamber having a pasta-inlet port and a pasta-outlet port, characterised in that it includes:

means for hermetically closing and opening the ports, an endless pasta conveyor extending in each drying chamber, in a position such that it is accessible through the pasta-inlet and outlet ports, a plurality of removable pasta-holders on the conveyor, a plurality of tunnels connecting the drying chambers, each tunnel connecting two successive, adjacent chambers and extending from the pasta-outlet port of one chamber to the pasta-inlet port of the other chamber, and a transfer device installed in each tunnel for removing the pasta-holder from the conveyor of one drying chamber and placing it on the conveyor of the next, adjacent chamber.

2. A drier according to claim 1, characterised in that the means for hermetically closing end opening the pasta-inlet port and the pasta-outlet port comprise respective pairs of gates operated independently of each other.

3. A drier according to claim 2, characterised in that each pair of gates is operated by a respective pair of pneumatic cylinders.

4. A drier according to claim 1, characterised in that the conveyor comprises two spaced-apart, vertical chains supported and driven by respective sprockets and in that the pasta-holders are cylindrical containers whose cylindrical walls are permeable to air and stream and which are hung removably on opposed cradle-shaped supports mounted on the chains.

5. A drier according to claim 1, characterised in that each tunnel is fixed releasably in a pressurised-fluid-tight manner to two adjacent drying chambers in correspondence with their pasta-inlet and outlet ports respectively.

6. A drier according to claim 3, characterised in that the pneumatic cylinders for operating the gates are installed in the tunnels.

7. A drier according to claim 4, characterised in that the transfer device comprises a trolley slidable on guides which extend from the pasta-outlet port of one drying chamber to the pasta-inlet port of the next drying chamber and having upper arms parallel to the guides with cradle-shaped supports for supporting respective cylindrical containers at their opposite ends.

8. A drier according to claim 7, characterised in that the trolley is movable on the guides from a first position in which the supports at one end of the arms interfere with the downward path of the supports on the chains of one drying chamber and second position in which the supports at the other end of the arms interfere with the upward path of the supports on the chains of the next drying chamber, the trolley also being able to stop in at least one third position intermediate the first and second positions.

9. A drier according to claim 1, characterised in that it includes a weighing station in each tunnel for weighing a holder.

10. A drier according to claim 9, characterised in that the weighing station operates in the third stopping position of the trolley.

11. A drier according to claim 1, characterised in that it includes a further transfer device which operates by the inlet port to the first drying chamber to insert a holder therein and place it on the conveyor of the first chamber.

12. A drier according to claim 1, characterised in that it includes a further transfer device which operates by the outlet port of the last drying chamber to remove a holder from the conveyor of that chamber and transfer it therefrom.

* * * * *

UNITED STATES PATENT AND TRADEMARK OFFICE

CERTIFICATE OF CORRECTION

PATENT NO. : 5,184,542

DATED : February 9, 1993

INVENTOR(S) : Pier C. Bottino, et. al.

It is certified that error appears in the above-identified patent and that said Letters Patent is hereby corrected as shown below:

On the Title page, item

[30] under Foreign Application Priority Data--should read, Apr. 23, 1991
[IT] Italy .........MI 91 A 001114

Signed and Sealed this

Thirtieth Day of November, 1993

Attest:

Bruce Lehman

BRUCE LEHMAN

*Attesting Officer*

*Commissioner of Patents and Trademarks*